(12) United States Patent
Teshima et al.

(10) Patent No.: US 7,696,859 B2
(45) Date of Patent: Apr. 13, 2010

(54) VEHICLE EQUIPMENT CONTROL SYSTEM AND METHOD

(75) Inventors: Kentaro Teshima, Kariya (JP); Kazuhiro Nakashima, Obu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 666 days.

(21) Appl. No.: 11/484,735

(22) Filed: Jul. 12, 2006

(65) Prior Publication Data

US 2007/0024121 A1    Feb. 1, 2007

(30) Foreign Application Priority Data

Aug. 1, 2005    (JP)    ............................. 2005-223296

(51) Int. Cl.
*B60R 25/00*    (2006.01)

(52) U.S. Cl. .............. 340/5.72; 340/539.32; 340/539.1; 340/426.13; 340/426.16; 340/426.17; 340/539.11; 340/10.3; 340/10.5; 340/10.1; 307/10.2; 307/10.3; 701/2; 701/49

(58) Field of Classification Search ............ 340/539.32, 340/539.1, 425.5, 426.1, 426.13, 426.16, 340/426.17, 426.18, 539.11, 10.3, 10.5, 10.1, 340/5.72; 307/10.2, 10.3; 701/2, 49, 36
See application file for complete search history.

(56) References Cited

U.S. PATENT DOCUMENTS

| | | | | |
|---|---|---|---|---|
| 5,563,453 A | * | 10/1996 | Nyfelt | .................... 307/10.2 |
| 5,602,535 A | * | 2/1997 | Boyles et al. | .............. 340/5.22 |
| 5,619,191 A | * | 4/1997 | Lambropoulos et al. | ... 340/5.22 |
| 5,896,094 A | * | 4/1999 | Narisada et al. | ............ 340/5.64 |
| 6,304,168 B1 | | 10/2001 | Ohta et al. | |
| 6,522,027 B1 | | 2/2003 | Morillon et al. | |
| 6,744,364 B2 | * | 6/2004 | Wathen | ................... 340/539.1 |
| 7,205,884 B2 | | 4/2007 | Kumazaki et al. | |
| 7,400,243 B2 | * | 7/2008 | Sumida et al. | ......... 340/539.11 |
| 2004/0257296 A1 | | 12/2004 | Ieda et al. | |
| 2005/0242923 A1 | * | 11/2005 | Pearson et al. | ............. 340/5.62 |

(Continued)

FOREIGN PATENT DOCUMENTS

DE    10234231 A1    2/2004

(Continued)

OTHER PUBLICATIONS

Korean Examination Report issued Mar. 28, 2007 in corresponding Korean Application No. 10-2006-00713837, together with an English translation.

(Continued)

*Primary Examiner*—Daryl C Pope
(74) *Attorney, Agent, or Firm*—Nixon & Vanderhye PC (57) ABSTRACT

A vehicle equipment control system locks vehicle doors by any one of auto-lock and trigger lock systems. In the auto-lock system, a wide communication area is set that covers an entire vehicle compartment is set. In the trigger lock system, a narrow communication area is set that disables the communication with a portable unit carried by a user near a vehicle. When no response signal is received from the portable unit in the respective communication areas, the respective vehicle doors are locked. Accordingly, even when any one of the auto-lock and trigger lock systems is used, the portable unit is prevented from being left in the compartment, and the respective vehicle doors can be locked.

15 Claims, 5 Drawing Sheets

U.S. PATENT DOCUMENTS

| | | | |
|---|---|---|---|
| 2006/0186993 A1* | 8/2006 | Inoue | 340/5.72 |
| 2007/0040650 A1* | 2/2007 | Handley et al. | 340/5.64 |
| 2007/0229219 A1* | 10/2007 | Nakashima et al. | 340/5.61 |

FOREIGN PATENT DOCUMENTS

| | | |
|---|---|---|
| DE | 102004042112 A1 | 3/2005 |
| JP | 10-059131 | 3/1998 |
| JP | 11-101033 | 4/1999 |
| JP | 2000-145228 | 5/2000 |
| JP | 2003-269023 | 9/2003 |

OTHER PUBLICATIONS

German Office Action, dated Feb. 26, 2008, issued in counterpart German Application No. 10 2006 035 651.9-51 with translation.

Chinese Office Action dated Sep. 19, 2008, issued in counterpart Chinese Application No. 200610100989.9, with English translation.

* cited by examiner

VEHICLE EQUIPMENT CONTROL SYSTEM AND METHOD

CROSS REFERENCE TO RELATED APPLICATION

This application is based on and incorporates herein by reference Japanese Patent Application No. 2005-223296 filed on Aug. 1, 2005.

FIELD OF THE INVENTION

The present invention relates to vehicle equipment control system and method that allow two-way communication between a portable unit and an in-vehicle unit and that controls vehicle equipment mounted in a vehicle in accordance with the result of the communication.

BACKGROUND OF THE INVENTION

Conventionally, JP-2003-269023A for example, proposes a vehicle equipment control system. The system has an auto-lock function for automatically locking vehicle doors when a user leaves a vehicle. In the system, the distance permitting auto-locking is specifiable. When a "short distance" is specified, then the auto-lock function is executed upon the condition where LF (low frequency) communication from the vehicle device to the portable unit becomes disabled. On the other hand, when a "long distance" is specified, the auto-lock function is executed upon the condition where UHF (ultra high frequency) communication from the portable unit to the vehicle device becomes disabled.

Further, JP-10-59131A proposes another door locking system. In this door locking system, an operation of a switch provided in a respective door knob of a vehicle is set as a trigger, and two-way communication between an in-vehicle device and a portable transmitter-receiver device (portable unit) is performed in response to that operation. In the event that a normal response signal has been received from the portable unit, a corresponding door of the vehicle is locked through the vehicle device. In this system, when locking the door, a low output verification signal and a high output verification signal are output from the in-vehicle device, thereby to prevent the portable unit from being forgotten in the vehicle compartment. More specifically, the system can be preset such that a receivable range of low output verification signals in the portable unit is substantially the same as those in the compartment. As such, in the event that a response to the low output verification signal has been received, then it can be determined that the portable unit is forgotten in the compartment.

Alternatively, when no response to the low output verification signal has been received, then the high output verification signal is succeedingly transmitted to verify the existence of the response from the portable unit. The receivable range of the high output verification signals is preset to include a predetermined range covering the vicinity of the vehicle. As such, when the response to the high output verification has been received from the portable unit, then it is determined that the user of the portable unit is present in the outside of the vehicle, and hence door is locked.

As described above, the vehicle door locking systems include auto-lock and trigger lock systems. The auto-lock system locks the respective vehicle door automatically upon leaving of the user from the vehicle. The trigger lock system operates in response to a trigger set to the user operation performed on a switch provided in a vehicle door.

In order to improve usability of such systems for users, it is preferable that the vehicle door is lockable by any one of the auto-lock and trigger lock systems. In this case, in the event that the user gets off the vehicle and moves away without operating the switch provided in the vehicle door, the door is locked by the auto-lock system. Alternatively, in the event that the user has operated the switch provided in the vehicle door, the vehicle door is locked by the trigger lock system.

However, in the case that the vehicle door lockable by using any one of the auto-lock and trigger lock systems, such drawbacks as described below may arise.

It is preferable that, as described in JP-10-59131A, in order to prevent the portable unit from being forgotten and confined in the compartment, when locking the vehicle door, an inside transmitter for transmitting request signal towards a vehicle compartment is used to verify whether the portable unit is present in the compartment. However, this approach encounters difficulty in setting a transmission range of the request signal of the inside transmitter to include the overall area in the compartment into a communication area that enables communication with the portable unit. This is because, when the transmitting range of the request signal is set in such the manner, the transmitting wave of the request signal leaks from a window of the respective vehicle door.

When operating a switch of a vehicle door to lock the vehicle door, a user is located relatively close to the vehicle. As such, when the transmission wave of the request signal has leaked, the portable unit carried by the user may react with the leaking request signal and can return a response signal. Consequently, while the user is carrying the portable unit, an alarm indicating that the portable unit has been forgotten in the compartment occurs and the vehicle door cannot be locked.

In order to overcome such drawbacks, it is contemplated that when operating the switch of the vehicle door, the user reduces the transmission output level to an extent not causing the reaction of the portable unit. In this case, however, in the compartment, there occurs a dead zone area that disables the communication between the inside transmitter and the portable unit. As such, in the event that, while the portable unit is placed in the dead zone area, the user gets out of the vehicle and executes the auto-lock function under the condition where the two-way communication with the inside transmitter is disabled, the portable unit is undesirably confined in the compartment. Alternatively, suppose that the auto-lock function has been executed under the condition where, as described in JP-2003-269023A, the communication with the transmitter covering the exterior of the vehicle is disabled. In this case, an event can take place in which the vehicle is left in a place in the condition where the auto-lock function is not executed and hence the vehicle doors are unlocked.

SUMMARY OF THE INVENTION

The present invention has an object to provide vehicle equipment control system and method capable of appropriately locking respective vehicle doors by using any one of the auto-lock and trigger lock systems.

In a vehicle equipment control system according to one aspect of the present invention, in the event that a trigger switch for directing locking of a vehicle door is not operated, a communication area for the communication between an inside transmitter and a portable unit is set to be large in comparison to the case where the trigger switch is operated. Accordingly, when locking the respective vehicle doors according to the auto-lock system, the system makes it possible to set the communication area covering the entire compartment. Alternatively, when locking the respective vehicle door according to the trigger lock system in response to the user operation of the trigger switch, the system makes it possible to set the communication area having the size sufficient to disable the communication with the portable unit carried by the user. Consequently, in the case that any one of the auto-lock and trigger lock systems is used, the vehicle door can be appropriately locked while the portable unit is prevented from being forgotten in the compartment.

In a vehicle equipment control method according to another aspect of the present invention, a request signal is transmitted from an inside transmitter in a vehicle compartment when an opening/closing operation of a vehicle door is detected. The vehicle door is controlled based on a response signal transmitted from the portable unit in response to the request signal. The request signal is also transmitted from the inside transmitter at a lower output level when a locking operation of the vehicle door is detected. Another request signal is transmitted from an outside transmitter provided outside the vehicle in place of the request signal of the inside transmitter, when the portable unit has transmitted no response signal to the request signal transmitted in response to the locking operation. The vehicle door is controlled based on the response signal transmitted from the portable unit in response to the request signal of the outside transmitter.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
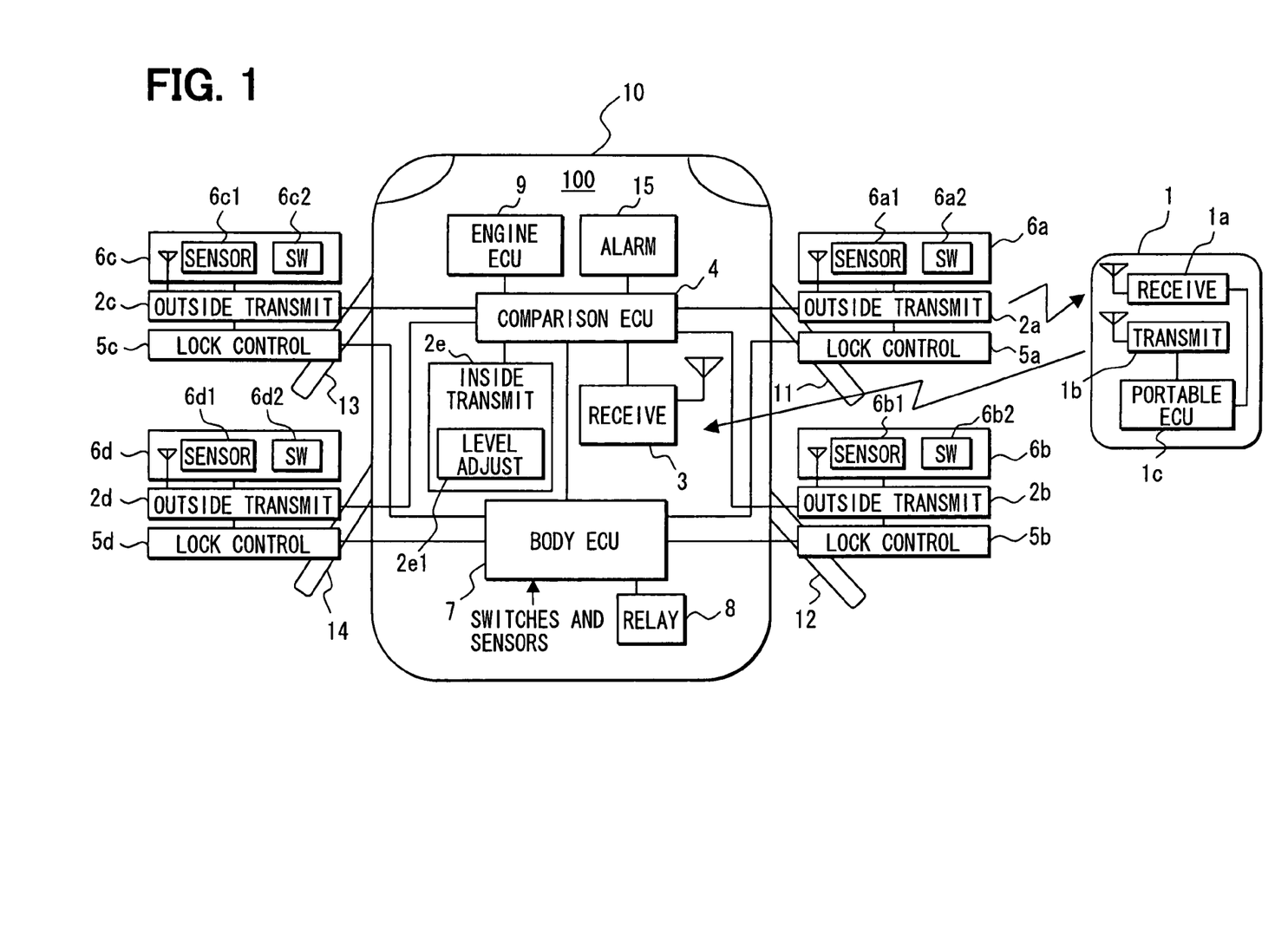
FIG. 1 is a schematic diagram showing a vehicle equipment control system according to a first embodiment of the present invention.

A vehicle equipment control system according to an embodiment is shown in FIG. 1. The system controls a lock or unlock mode of each door of a vehicle 10 in accordance with comparison of identification (ID) codes through two-way communication between a portable unit 1 and an in-vehicle unit 100 provided in the vehicle 10. The in-vehicle unit 100 controls a permission or inhibition mode for starting an engine of the vehicle 10 to improve security of the vehicle 10.

The portable unit 1 includes a receiver 1a and a transmitter 1b. The receiver 1a receives a request signal from either one of outside transmitters 2a to 2d or an inside transmitter 2e of the in-vehicle unit 100. In response to the received request signal, the transmitter 1b transmits a request signal including, for example, an ID code. A portable unit ECU 1c is connected to the receiver 1a and the transmitter 1b, and executes various control processes and operations. More specifically, the portable unit ECU 1c performs operations, such as determination of the presence or absence of the request signal in accordance with the received signals of the receiver 1a, generation of the response signal inclusive of the ID code and the like, and control of the response signal to be transmitted from the transmitter 1b in response to the corresponding request signal.

The in-vehicle unit 100 includes the outside transmitters 2a to 2d provided in each of the doors 11 to 14 of the vehicle 10, and the inside transmitter 2e provided in the compartment. The outside transmitters 2a to 2d and the inside transmitter 2e each transmit the request signal in accordance with a transmission instruction signal received from a comparison ECU 4 of the in-vehicle unit 100.

Coverage distances of request signals of the respective outside transmitters 2a to 2d are set to the range of from about 0.7 m to about 1.0 m. During parking of the vehicle 10, respective communication areas for the communication with the portable unit 1, which correspond to the coverage distances of the request signals, are periodically formed around the respective doors 11 to 14 of the vehicle 10. With this, it can be detected that the user of the portable unit 11 has approached or is present close to the vehicle 10. The communication area for the communication by the inside transmitter 2e with the portable unit 1 is formed to cover the vehicle compartment at the time of, for example, starting of the engine or locking of the door, thereby to detect whether or not the portable unit 1 is present in the compartment. The inside transmitter 2e can be configured to include a front-seat dedicated inside transmitter with a communication area mainly covering, for example, a front seat, and a rear-seat dedicated inside transmitter with a communication area mainly covering, for example, a rear seat. In this case, the entire compartment is covered by a total communication area created by combining the respective communication areas provided with two inside transmitters dedicated to the front seat and the rear seat.

In the present embodiment, the inside transmitter 2e includes an output level adjusting circuit 2e1. With the output level adjusting circuit 2e1, a request signal transmission output level can be caused variable or adjustable. Consequently, the inside transmitter 2e is capable of causing the size of a transmission area of the request signal, i.e., the size of the communication area, for the communication with the portable unit 1, to be adjustable.

Figure 2:
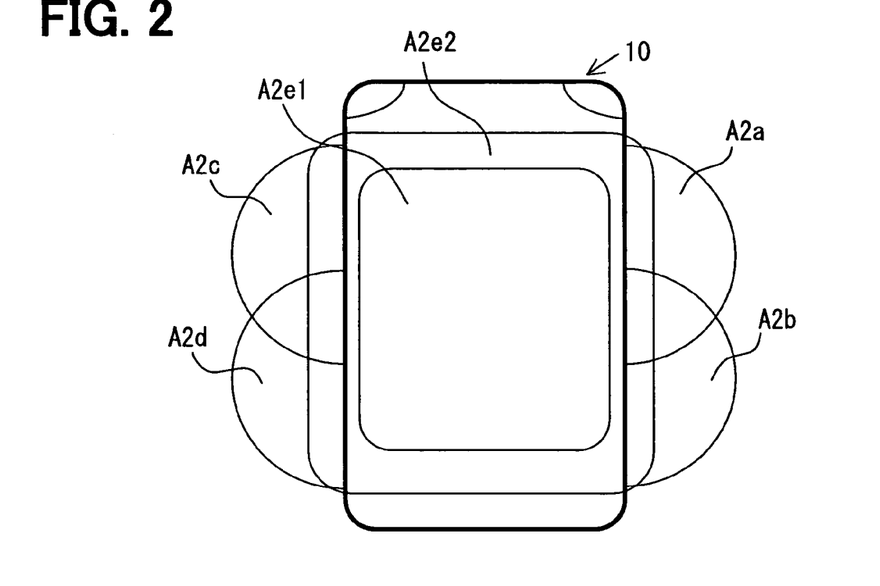
FIG. 2 is a schematic view showing a communication area for an inside transmitter.

Communication areas A2a to A2d of the outside transmitters 2a to 2d are shown in FIG. 2, respectively. The output level adjusting circuit 2e1 of the inside transmitter 2e is preset to adjust the request signal transmission output level to two sub-levels. The two sub-levels of the request signal transmission output level are a low output level and a high output level. The low output level and the high output level are for defining a first communication area A2e1 and a second communication area A2e2, respectively. The low output level is determined mainly by placing importance to maximally prevent the possible leakage occurring through the window of the vehicle door. The high output level is determined by placing importance to prevent possible occurrence of a dead zone area in which the communication with the portable unit 1 in the compartment cannot be attained.

As such, in the event that the request signal transmission output level is the low output level, as shown in FIG. 2, there is formed the first communication area A2e1 that, while permitting occurrence of some dead zone area, substantially covers the entire compartment. In addition, this communication area is prevented from expanding to the vehicle outside through the window of the respective vehicle door. In the event that the request signal transmission output level is the high output level, as shown in FIG. 2, there is formed the second communication area A2e2 that, while completely covering the compartment, is expanded further to the vehicle outside through the window of the respective vehicle door. Thus, the areas A2e1 and A2e2 are set narrower and wider than the vehicle compartment, respectively.

In addition, the in-vehicle unit 100 provided in the compartment includes a receiver 3. The receiver 3 is controlled to a response-signal receivable mode in synchronism with the operation of outputting transmission signals to the transmitters 2a to 2e, thereby to receive response signals transmitted from the portable unit 1. The response signal received by the receiver 3 is output to the comparison ECU 4.

The comparison ECU 4 performs comparison to determine whether a predetermined relationship, such as a matched relationship between an ID code included in the received response signal and a pre-registered registration code of each vehicle. Then, in response to the comparison result, i.e., YES (affirmative) or NO (negative), with a body ECU 7, the comparison ECU 4 controls, for example, a lock or unlock mode of the respective door and the permission or inhibition mode for starting the engine.

The body ECU 7 controls, for example, on/off operations for power supply to the respective equipment mounted in the vehicle 10, and outputs driving signals for controlling the respective lock or unlock modes of vehicle doors 11 to 14 to lock control units 5a to 5d provided in the respective doors 11 to 14. In the body ECU 7, there are input signals from, for example, respective sensors and switches (SW) to determine whether or not the condition for starting the engine is satisfied. More specifically, the body ECU 7 inputs signals of equipment provided near the driver's seat, such as, for example, an engine switch to be operated by the user to provide an instruction for starting or stopping the engine, a vehicle speed sensor for detecting the travel speed of the vehicle 10, a shift position sensor for detecting the shift position of a transmission (gear set), a stop lamp switch for outputting an ON signal upon operation performed by a driver on the brake pedal, and door courtesy lamp switches each for detecting door opening and closing operations.

In the event that it is determined that the condition for starting the engine is satisfied and hence power is supplied to the respective vehicle equipment, the body ECU 7 drives a relay circuit 8 and causes power to be supplied via the relay circuit 8 to the respective vehicle equipment from a battery (not shown). The in-vehicle unit 100 also includes, in a respective one of the doors 11 to 14 of the vehicle 10, lock control units 5a to 5d that locks or unlocks the respective doors 11 to 14. More specifically, the lock control units 5a to 5d, respectively, include door lock motors (not shown) that each forwardly/backwardly (reciprocally) rotate in response to a lock signal/unlock signal transmitted from the body ECU 7, thereby to lock or unlock the respective vehicle doors 11 to 14.

Touch sensors 6a1 to 6d1 are, respectively, provided in door handles 6a to 6d of the doors 11 to 14 of the vehicle 10, thereby to enable detecting that the user of the portable unit 1 has operated a respective one of the door handles 6a to 6d by touching the respective one of the door handles 6a to 6d. In addition, door lock switches 6a2 to 6d2 formed as push switches are provided in the door handles 6a to 6d, respectively. Operation of the respective door lock switches 6a2 to 6d2 makes it possible to lock the doors 11 to 14. The respective door handles 6a to 6d operate as radio antennas for the outside transmitters 2a to 2d.

The detection of the operation performed by the user of the portable unit 1 on each of the vehicle doors 11 to 14 need not be performed only by the touch sensors 6a1 to 6d1. The detection can instead be performed by using detecting mechanisms that mechanically detect the operation of pulling the respective one of the door handles 6a to 6d towards the side of the user. Still alternatively, an unlock button may be provided in the respective one of the door handles 6a to 6d, in which the operation on the respective one of the vehicle doors 11 to 14 can be detected by the operation on the unlock button. Still alternatively, either of the touch sensors 6a1 to 6d1 and the door lock switches 6a2 to 6d2 may be provided in the respective vehicle doors 11 to 14 and may be sharedly used as respective operation units for executing unlocking and locking.

In this embodiment, when the engine switch has been operated, the permission or inhibition mode for starting the engine is controlled in accordance with the result of comparison of the ID code to improve the security of the vehicle 10. More specifically, the comparison ECU 4 of the in-vehicle unit 100 is connected to an engine ECU 9 that controls an operation mode of the engine, thereby to output a control signal representing an instruction for the permission or inhibition for starting the engine in accordance with the result of comparison of the ID code. In the event of door lock control, the comparison ECU 4 instructs the engine ECU 9 to set the engine to a start inhibition mode.

The in-vehicle unit 100 further includes an alarming device 15. Thereby, in the event of locking the vehicle doors 11 to 14, the in-vehicle unit 100 determines whether the portable unit 1 is forgotten and left in the compartment. When the portable unit 1 is forgotten in the compartment, the in-vehicle unit 100 provides an alarm through the alarming device 15. The alarming device 15 provides the alarm in the form of audio, buzzer, or light emission.

The following briefly describes unlock control of the respective vehicle doors 11 to 14.

In the case that the vehicle 10 is being parked and its engine is not being operated with the respective doors 11 to 14 remained locked, the comparison ECU 4 provides an instruction to the respective one of the outside transmitters 2a to 2d to perform signal transmission periodically, that is, in units of the passage of a predetermined time. Thereby, the comparison ECU 4 verifies whether or not the user of the portable unit 1 has approached the vehicle 10, that is, whether the user is in any of the communication areas A2a to A2d.

In this case, the outside transmitters 2a to 2d, respectively, transmit request signals including ID codes unique to the respective outside transmitters 2a to 2d, and the portable unit 1 is configured to transmit response signals respectively including the ID codes. Thereby, it can be identified that the user of the portable unit 1 has approached to which one of the vehicle doors 11 to 14. Alternatively, in order to identify the position of one of the vehicle doors 11 to 14 that the user of the portable unit 1 has approached, the comparison ECU 4 may be used to provide the instructions to the outside transmitters 2a to 2d to transmit request signals in the order with shifted timings thereof.

When the portable unit 1 transmits the response signal in response to any one of request signals of the outside transmitters 2a to 2d, the response signal is received by the receiver 3 of the in-vehicle unit 100. The comparison ECU 4 performs the ID code comparison to determine whether or not the ID code included in the response signal satisfies a predetermined relationship, such as a matched relationship with the pre-registered registration code.

When the comparison ECU 4 has determined that the comparison result is Yes, then the comparison ECU 4 further determines the position of the user of the portable unit 1 from the ID code included in the response signal. Then, one of the touch sensors 6a1 to 6d1 of the vehicle doors 11 to 14 that corresponds to the position is activated, whereby to provide an instruction (signal) to the body ECU 7 to set the respective vehicle doors 11 to 14 to the unlock standby mode. In accordance with the instruction signal, the body ECU 7 sets the respective vehicle doors 11 to 14 to the unlock standby mode.

When the user of the portable unit 1 has touched the respective door handles 6a to 6d of the vehicle doors 11 to 14 set to the unlock standby mode, then the door handle operation of the user of the portable unit 1 is detected by the touch sensors 6a1 to 6d1, and detection signals thereof are transmitted to the comparison ECU 4. In response thereto, the comparison ECU 4 provides to the body ECU 7 the instruction signal for unlocking all the vehicle doors 11 to 14. In accordance with the instruction signal, the body ECU 7 outputs an unlock drive signal to the lock control units 5a to 5d of the respective the vehicle doors 11 to 14, thereby to unlock the respective vehicle doors 11 to 14.

According to the present embodiment, the respective vehicle doors 11 to 14 can be locked by any one of the auto-lock and trigger lock systems. The auto-lock system automatically locks the respective one of the vehicle doors 11 to 14 upon leaving of the user from the vehicle 10a, and the trigger lock system locks the respective vehicle doors 11 to 14 in response to a trigger set to the user operation performed on the switch on the door lock switches 6a2 to 6d2.

Figure 3:
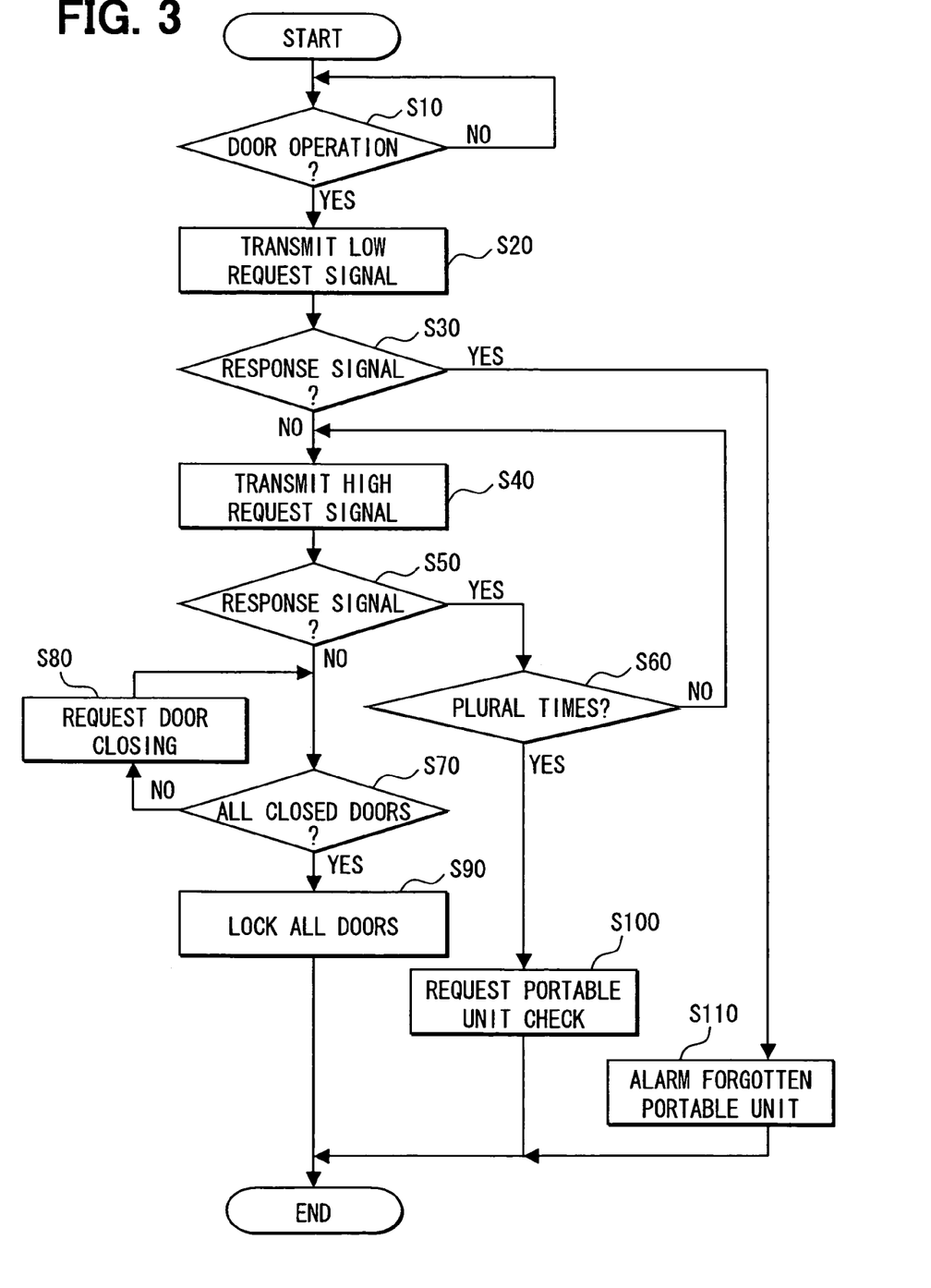
FIG. 3 is a flowchart showing door lock control according to an auto-lock system.
Figure 4:
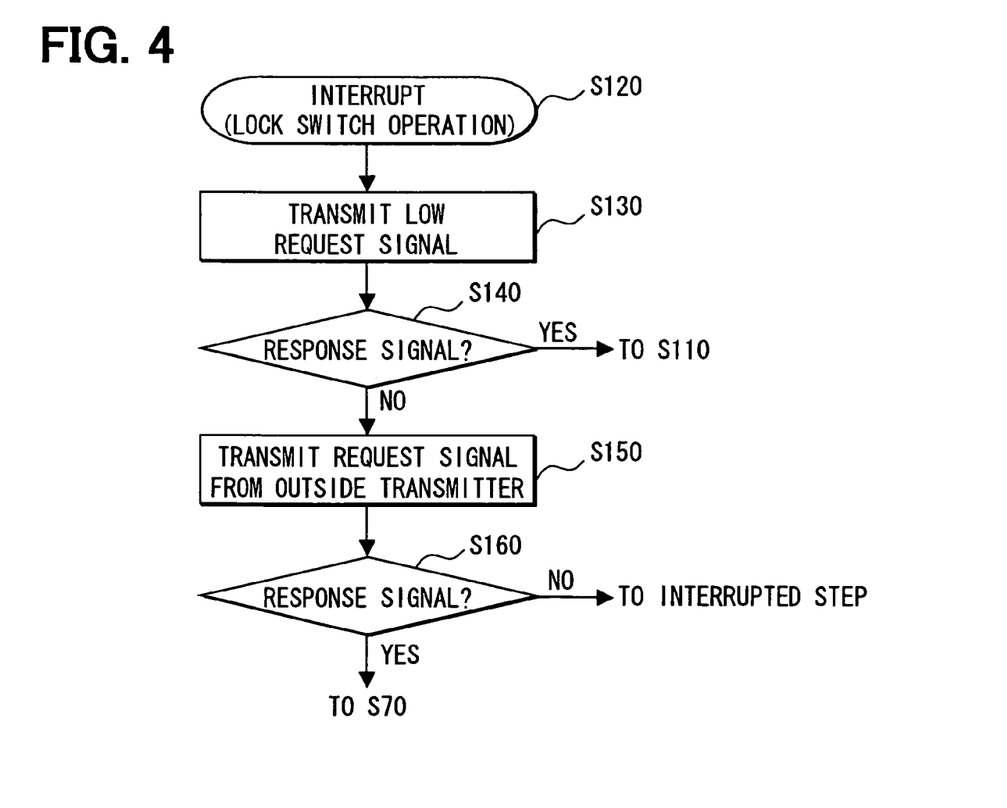
FIG. 4 is a flowchart showing door lock control according to a trigger lock system.

The lock control according to the present embodiment is shown in FIGS. 3 and 4. The flowchart of FIG. 3 represents lock control according to the auto-lock system (auto-lock type door lock control), and the flowchart of FIG. 4 represents lock control according to the trigger lock system (trigger-lock type lock control).

In order to detect that the user of the portable unit 1 has gotten off the vehicle 10, at step S10 shown in FIG. 3 it is determined whether or not the respective vehicle doors 11 to 14 have been operated, that is, opened or closed. It can be determined in accordance with signals from, for example, courtesy lamp switches (not shown) whether or not the respective vehicle doors 11 to 14 have been opened or closed. In this determination process, the processes at step S20 and thereafter are executed only in the event that it is determined that the vehicle doors 11 to 14 have been opened or closed. Accordingly, the two-way communication between the inside transmitter 2e and the portable unit 1 can be executed by the processes at step 20 to determine whether or not the vehicle doors 11 to 14 have to be locked. Consequently, either the inside transmitter 2e or the portable unit 1 is capable of preventing wasteful power consumption. In this case, an engine-stopped instance may be added to the condition for permitting the execution of two-way communication between the inside transmitter 2e and the portable unit 1.

At step S20, a first request signal is transmitted at a first output level (low output level) from the inside transmitter 2e. Thereby, the communication area for the communication between the inside transmitter 2e and the portable unit 1 is set to the first communication area A2e1. In this case, in the receiver 3, when a response signal causing the result of the ID code comparison to be YES, there is a high probability that the portable unit 1 has been forgotten in the compartment. For this reason, in response to the transmission of the response signal at step S20, at step S30 it is determined whether or not a request signal causing the result of the ID code comparison to be YES has been received. In the event that the determination result is "Yes," the process proceeds to step S110, at which alarming for the possibly-forgotten portable unit 1 (alarming for possibly-forgotten portable unit) is executed by the alarming device 15.

A communication procedure in the two-way communication between the respective one of the transmitters 2a to 2e of the in-vehicle unit 100 and the portable unit 1 will be described in further detail herebelow. Description herebelow will refer to an example case of the communication between the portable unit 1 and the outside transmitter 2a of the in-vehicle unit 100.

The portable unit 1 stays in a sleep mode before the start of the communication. As such, the outside transmitter 2a transmits an activation request signal for waking up the portable unit 1. The portable unit 1 is waken up by the activation request signal, and transmits back a first acknowledge signal (first ACK signal). When the first ACK signal is received by the receiver 3, in the event that an ID code different from unit to unit of a vehicle is included therein and the portable unit 1 has a vehicle ID code identical to the received ID code, then the outside transmitter 2a transmits back a first transmission request signal requesting for transmission of a second ACK signal. Upon receipt of the first transmission request signal, the portable unit 1 transmits the second ACK signal in response thereto when having the same vehicle ID code as that included in the first transmission request signal.

When the second ACK signal is received by the receiver 3, the outside transmitter 2a transmits a second transmission request signal including a code different from unit to unit of the transmitter and requesting for the ID code. The portable unit 1 creates a response code by using the code included in the second transmission request signal and then transmits a response signal including the created response code. In the event that the outside transmitter 2a has received the activation request signal and the first transmission request signal, when no first and second ACK signals are transmitted in response thereto from the portable unit 1, it is assumed that the portable unit 1 does not exist in the communication area, and hence the communication is terminated.

As described above, the response code is created by using the code different from unit to unit of the transmitter. Consequently, the comparison ECU 4 can securely identify from the response code that the response signal has been transmitted in response to the signal which one of the transmitters 2a to 2e. In the communication process described above, the activation request signal and the first and second transmission request signals correspond to request signals that are transmitted from the respective transmitters, and the first and second ACK signals and the response signal correspond to response signals that are transmitted from the portable unit 1.

However, as described above, even without using the code different from unit to unit of the transmitter, it can be verified that the portable unit 1 has transmitted the response signal in response to the signal transmitted from which one of the transmitters in such a manner that the timing of reception of the request signal from the respective transmitter is shifted. In addition, the codes described above do not have to be used because the request signal transmission timing of the inside transmitter 2e is different from the request signal transmission timings of the outside transmitters 2a to 2d. It is sufficient to be able to verify the presence of the portable unit 1 in the compartment. Further, the above-described communication procedure can omit the process of transmitting the first transmission request signal from the in-vehicle unit 100 and the process of transmitting the second ACK signal corresponding thereto from the portable unit 1.

In accordance with the communication procedure, upon receipt of the request signal including the ID code from the portable unit 1, the comparison ECU 4 determines whether or not the ID code included in the response signal satisfies the predetermined relationship, such as a matched relationship with the pre-registered registration code. In the event that the predetermined relationship is satisfied, it is determined that the comparison result is Yes and in the event that the predetermined relationship is not satisfied, it is determined that the comparison result is NO.

When at step S30 it is determined that the response signal causing the result of the ID code comparison to be YES has not been received, then at step S40 a second request signal is transmitted at a second output level (high output level) from the inside transmitter 2e. Thereby, the communication area for the communication between the inside transmitter 2e and the portable unit 1 completely covers the vehicle compartment. In addition, the communication area is set to the second communication area A2e2 expanded to the outside of the vehicle 10 by the transmission wave leaking from the windows of the respective vehicle door. Then, at step S50 it is determined whether or not a response signal causing the result of the ID code comparison to be YES has been received in response the request signal transmitted at step S40.

Since at step S40 the request signal is transmitted at the high output level, when the user carrying the portable unit 1 is present near the vehicle 10, then the determination result of step S50 can be "Yes." In this event, the process proceeds to step S60, at which it is determined whether or not the number of response signal reception times has reached a predetermined number of plural times. As a consequence of the determination of step S60, when it is determined that the number of times is less than the predetermined number of times, then the processes from step S40 are repeatedly executed.

When the user carrying the portable unit 1 moves apart the vehicle 10, it is determined at step S50 that no response signal is received (response signal reception is invalid). In this case, since the portable unit 1 has been carried to the vehicle outside, the process proceeds to step S70, at which it is determined whether or not all of the vehicle doors 11 to 14 of the vehicle 10 are closed. In this step, when it is determined that any of the vehicle doors 11 to 14 is open, then the process proceeds to step S80, at which an alarm or request is issued by using the alarming device 15 for the necessity of verification of the vehicle door. When the user has closed the vehicle door, then at step S70 it is determined that all of the vehicle doors 11 to 14 have been closed. When all the doors have been closed, then the process proceeds to step S90.

At step S90, the respective lock control units 5a to 5d are instructed so that all of the vehicle doors 11 to 14 are closed. Thereby, it is verified that all of the vehicle doors 11 to 14 have been closed, all of the vehicle doors 11 to 14 are locked at the same time, any of the vehicle doors 11 to 14 can be prevented from being inadvertently remained unlocked. At the same time as the door locking operation, the comparison ECU 4 instructs the engine ECU 9 to set the engine to a start inhibition mode.

In the determination process of step S60, in the event that the number of response signal reception times has reached the predetermined number of times, the situation is that the portable unit 1 is kept present near the vehicle 10. As such, the process proceeds to step S100, at which an alarm is provided by the alarm device 15 to request checking the position of portable unit 1. More specifically, in the situation described above, a case is contemplated in which, for example, the portable unit 1 is present in the dead zone area of the first communication area A2e2, or the user carrying the portable unit 1 stays in a compartment wave leakage area. In this situation, the two-way communication is terminated to save the power consumption in the inside transmitter 2e and the portable unit 1. Further, the alarm prompts the user to verify the position of the portable unit 1.

As described above, in the auto-lock type door lock control, a case can take place in which no response signal is received even after trying the two-way communication by setting the communication area for the communication between the inside transmitter 2e and the portable unit 1 to the first communication area (first in-vehicle communication area) A2e1. In this case, the two-way communication is retried by setting the communication area for the communication between the inside transmitter 2e and the portable unit 1 to the second communication area (second in-vehicle communication area) A2e2, which is wider than the first area A2e1. This manner of operation enables monitoring of the position of the portable unit 1 to trace the movement of the portable unit 1 from the vehicle compartment to the vehicle outside.

However, it can be verified whether or not the portable unit 1 has been forgotten in the compartment by trying the two-way communication by setting the communication area for the communication between the inside transmitter 2e and the portable unit 1 to the second communication area A2e2. As such, the try for the two-way communication by using the first communication area A2e1 can be omitted.

During the process of auto-lock type door lock control, when the respective door lock switches 6a2 to 6d2 are operated, the door lock control is executed by an interrupt process. More specifically, in response to the operation of the respective door lock switches 6a2 to 6d2 (step S120 in FIG. 4), the auto-lock type door lock control shown in FIG. 3 is interrupted, and the process shown in the flowchart of FIG. 4 is started.

At step S130, the first request signal is transmitted at the low output level from the inside transmitter 2e. Thereby, the communication area for the communication between the inside transmitter 2e and the portable unit 1 is set to the first communication area A2e1. This enables the transmission wave of the request signal to be prevented from leaking to the vehicle compartment. Consequently, even when the user of the portable unit 1 stays near the vehicle 10 to operate the respective door lock switches 6a2 to 6d2, the portable unit 1 can be prevented from transmitting the response signal in response to the request signal transmitted from the inside transmitter 2e.

In response to the request signal of step S130, at step S140 it is determined whether or not a response signal causing the result of the ID code comparison to be YES has been received. In this determination process, in the event it is determined that the comparison result is "Yes," there is a possibility that the user has forgotten or left the portable unit 1 in the compartment. As such, the process proceeds to step S110 shown in FIG. 3, at which alarming for the possibly-forgotten portable unit 1 (alarming for possibly-forgotten portable unit) is performed by the alarming device 15.

When it is determined that a response signal causing the ID comparison result to be YES has not been received (response signal reception is invalid), the process proceeds to step S150. At step S150, third request signals are transmitted either from the outside transmitters 2a to 2d corresponding to the operated door handles 6a to 6d or all of the outside transmitters 2a to 2d. Then, at step S160, in response to the request signals transmitted at step S150, it is determined whether or not a request signal causing the result of the ID code comparison to be YES has been received.

In the determination process of step S160, when it is determined that the request signal causing the result of the ID code comparison to be YES has been received, then it is assumed that the user who has operated the respective door lock switches 6a2 to 6d2 is carrying the portable unit 1. As such, the process proceeds to the process of step S70 of FIG. 3. When a request signal causing the result of the ID code comparison to be YES has not been received, there is a high probability that the door lock switches 6a2 to 6d2 have been operated by a third person other than the regular user carrying the portable unit 1. As such, the process is returned to the process interrupted in the auto-lock type door lock control. Thus, in the event that the respective door lock switches 6a2 to 6d2 are operated, the two-way communication between the respective outside transmitters 2a to 2d and the portable unit 1 is tried in addition to the two-way communication between the respective inside transmitter 2e and the portable unit 1. Accordingly, it is possible to verify not only whether or not the portable unit 1 has been forgotten in the compartment, but also whether or not the operation has been performed by the user carrying the portable unit 1. In the event that the operation has been performed by a third person other than the user carrying the portable unit 1, the interrupted auto-lock type door lock control is resumed, the auto-lock type door lock control can be continually executed.

As described above, in the present embodiment, the size of the communication area in the event of the trigger-lock type lock control is set smaller than the communication area in the event of the trigger-lock type lock control. More specifically, the second communication area A2e2 covering the entire compartment is set in the event of the auto-lock type door lock control. In addition, the first communication area having the size sufficient to disabling the communication with the portable unit 1 carried by the user present near the vehicle 10 is set in the event of the trigger-lock type lock control. Consequently, in the case of any one of the auto-lock and trigger lock systems, the portable unit 1 can be prevented from being forgotten in the compartment, and the respective vehicle doors 11 to 14 can be appropriately locked.

While the preferred embodiment has been described above, it may be modified in many ways.

For example, in the above embodiment, in the event of the auto-lock type vehicle door lock control, the two-way communication between the inside transmitter 2e and the portable unit 1 is first tried in the first communication area A2e1. Then, when the response signal is not received, the two-way communication between the inside transmitter 2e and the portable unit 1 is retried in the second communication area A2e2. Also in the two-way communication in the second communication area A2e2, when the response signal is not received from the portable unit 1, the respective vehicle doors 11 to 14 are automatically locked.

Figure 5:
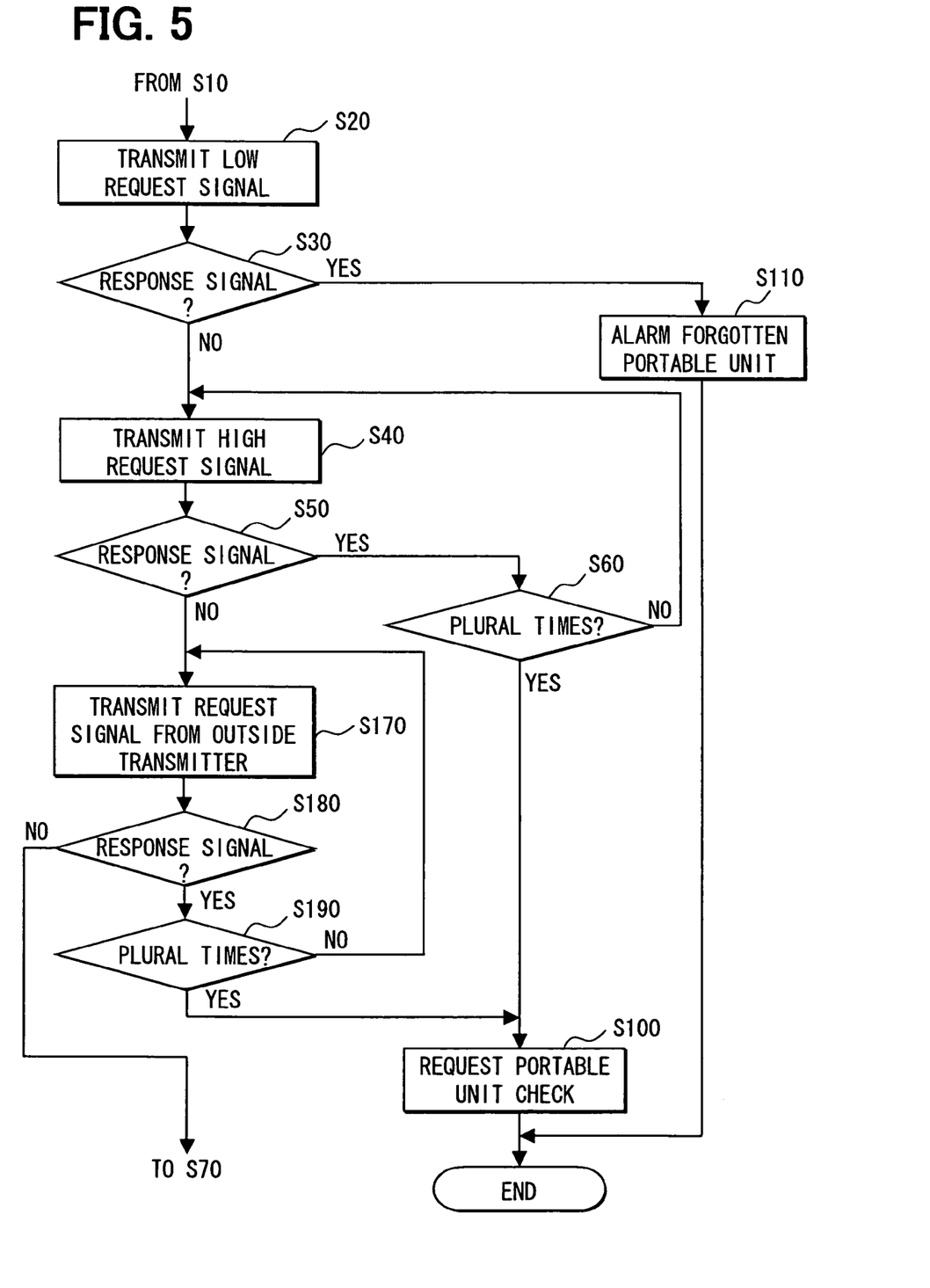
FIG. 5 is a flowchart showing a modification of the door lock control.

However, as shown in FIG. 5, the control may be performed such that the two-way communication is further performed between the outside transmitters 2a to 2d and the portable unit 1, in which when the response signal from the portable unit 1 is not received, the respective vehicle doors 11 to 14 are locked. More particularly, as in step S170 shown in FIG.5, request signals are transmitted from the respective outside transmitters 2a to 2d. In response to the request signals, at step S180 it is determined whether or not a request signal causing the result of the ID code comparison to be YES has been received. Immediately after the user has got off the vehicle 10, the communication between the respective outside transmitters 2a to 2d and the portable unit 1 is established. However, ordinarily, before the number of reception times of response signals reaches the predetermined number of times being determined at step S190, the user moves apart from the vehicle 10 thereby disabling the reception of response signals. In this case, the processes of steps S70 to S90 in FIG. 3 is executed, thereby locking the respective vehicle doors 11 to 14.

Thus, the respective vehicle doors 11 to 14 are locked with the timing of disabled reception of the response signal from the portable unit 1 in the two-way communication between the respective outside transmitters 2a to 2d and the portable unit 1. This enables locking the respective vehicle doors 11 to 14 after verifying that the portable unit 1 is moved by the user thereof to the outside of the communication area for the communication between the respective outside transmitters 2a to 2d and the portable unit 1.

Figure 6:
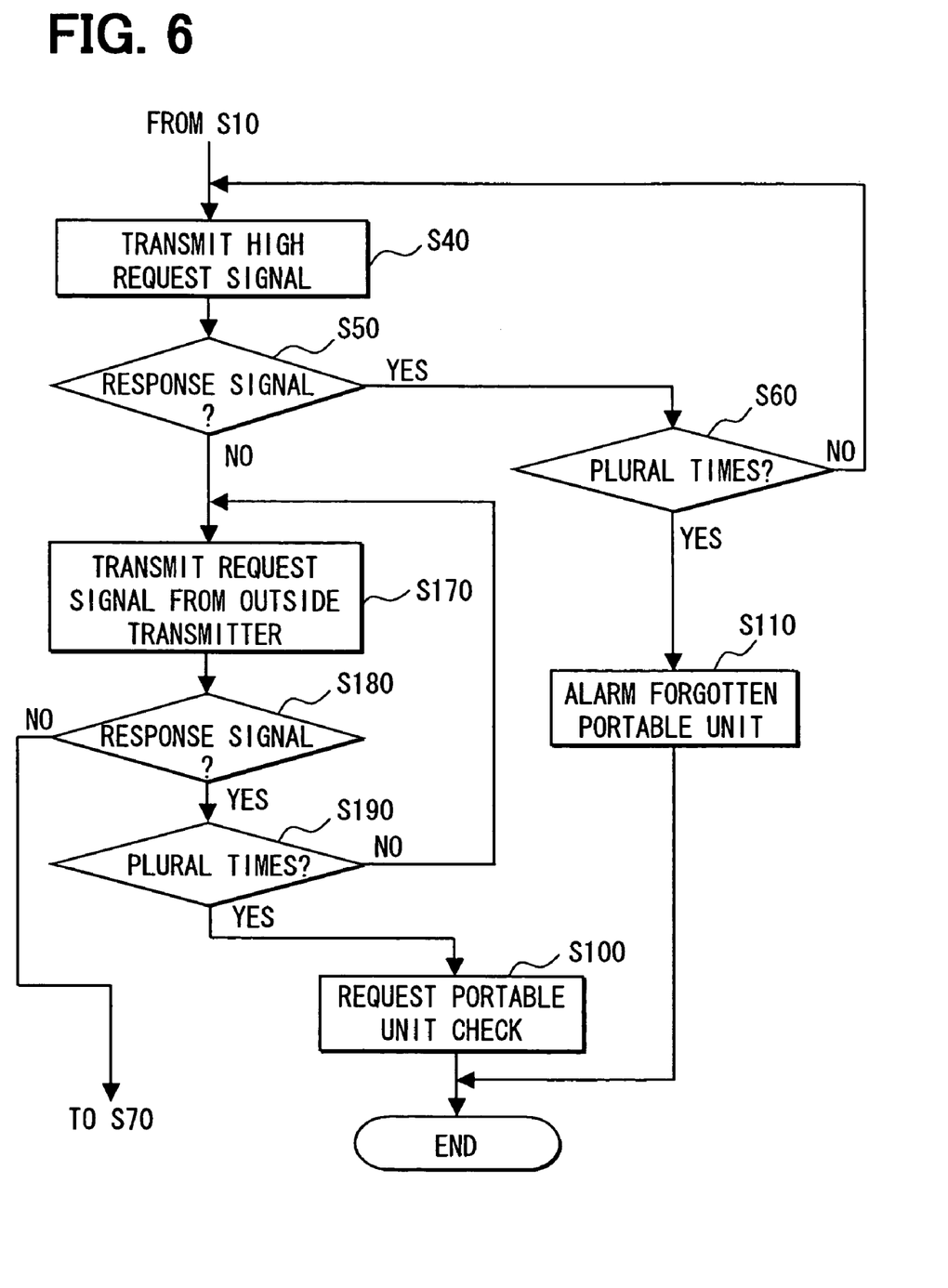
FIG. 6 is a flowchart showing another modification of the door lock control.

Further, as described above, in the auto-lock system, the two-way communication in the first communication area A2e1 between the inside transmitter 2e and the portable unit 1 is arbitrarily executable. This is also applicable to the example shown in FIG. 5. More specifically, as shown in FIG. 6, in the event of the auto-lock type vehicle door lock control, in either the two-way communication between the inside transmitter 2e and the portable unit 1 or the two-way communication between the respective outside transmitters 2a to 2d and the portable unit 1 in the second communication area A2e2, the respective vehicle doors 11 to 14 may be locked upon the condition where the response signal reception from the portable unit 1 is disabled.

In addition, according to the embodiment, the response signal transmission output level in the inside transmitter 2e is varied, whereby the communication area for the communication between the inside transmitter 2e and the portable unit 1 is set to any one of the first and second communication areas A2e1 and A2e2. However, the size of the communication area for the communication between the inside transmitter 2e and the portable unit 1 can be varied depending on the reception sensitivity of the portable unit 1.

In order to shift the reception sensitivity of the portable unit 1 to high sensitivities corresponding to the first and second communication areas A2e1 and A2e2, activation request signals or first transmission request signals as used in the above communication procedure for the communication between the respective transmitters 2a to 2e and the portable unit 1 are used. More specifically, the inside transmitter 2e transmits two different types of signals, namely, an activation request signal A (or, first transmission request signal A) instructing the portable unit 1 to perform reception at the low sensitivity and an activation request signal B (or, first transmission request signal B) instructing the portable unit 1 to perform reception at the high sensitivity. Thereby, the reception sensitivity of the portable unit 1 becomes shiftable to any one of the low sensitivity and the high sensitivity.

Further, adjusting of the request signal transmission output level of the inside transmitter 2e and shifting of the reception sensitivity of the portable unit 1 may be performed at the same time.

Further, according to the present embodiment, the comparison ECU 4 outputs the control signal instructing the engine ECU 9 for the permission or inhibition for starting the engine. This is because the condition that the regular user carrying the portable unit 1 is present in the vehicle 10 is set as the condition for starting the engine. In this case, it is preferable that the communication area for the communication with the inside transmitter 2e for receiving the response signal including the ID code from the portable unit 1 is set into the first communication area A2e1. This enables preventing the occurrence of an event permitting the start of the engine while the portable unit 1 is present in the vehicle cabin exterior.

Further, when the vehicle doors are locked, the door-locked state may be notified to the user by for example, turning on a hazard lamp of the vehicle, or by providing a buzzer or a light to the portable unit 1 to thereby generate sounds or light. This is especially effective to prevent door lock failure since the user performs no operation for locking in the event that the auto-lock type door lock control is performed.

What is claimed is:

1. A vehicle equipment control system comprising:
a portable unit that transmits a response signal including an ID code in response to a request signal; and
an in-vehicle unit that transmits the request signal, receives the response signal from the portable unit, performs a comparison between the ID code included in the response signal and a pre-registered code, and controls vehicle equipment in accordance with a comparison result,
wherein the in-vehicle unit comprises:
a receiver that receives the response signal from the portable unit;
an inside transmitter that, by using a compartment of a vehicle as a communication area for communication with the portable unit, transmits the request signal toward the compartment;
a trigger switch that is proved in a vehicle door and that provides an instruction for locking of the vehicle door when operated outside of the compartment of the vehicle;
communication area varying means that, in a case that the trigger switch is not operated, sets the communication area for the communication between the inside transmitter and the portable unit to be relatively large to expand outside of the compartment of the vehicle in comparison with a case that the trigger switch has been operated and the communication area is limited to be within the compartment of the vehicle; and
lock control means that locks the vehicle door in accordance with an event where the response signal responding to the request signal transmitted from the inside transmitter is not received in the communication area set by the communication area varying means to be relatively large.

2. The control system according to claim 1, wherein:
the in-vehicle unit further comprises a door opening/closing detection means that detects open/close operations of the vehicle door; and
the lock control means tries the two-way communication with the portable unit by causing the request signal to be transmitted from the inside transmitter in the communication area set by the communication area varying means when the open/close operation of the vehicle door has been detected by the door opening/closing detection means.

3. The control system according to claim 2, wherein:
the lock control means first executes door lock control according to an auto-lock system that executes the door lock control in accordance with the result of two-way communication between the inside transmitter and the portable unit in the communication area set to be relatively large, when the open/close operation of the vehicle door is detected by the door opening/closing detection means; and
the lock control means interrupts an auto door lock control and then executes, by interruption, door lock control according to a trigger lock system that executes the door lock control in accordance with the result of the two-way communication between the inside transmitter and the portable unit in the communication area set to be relatively small, when operation of the trigger switch is performed during the execution of the auto door lock control.

4. The control system according to claim 1, wherein:
the communication area varying means sets the communication area for the communication between the inside transmitter and the portable unit to any one of a first communication area and a second communication area larger than the first communication area, the first communication area being limited to be within the compartment of the vehicle and the second communication area being expanded to extend outside the compartment of the vehicle.

5. The control system according to claim 1, wherein:
the communication area varying means adjusts at least one of a transmission output level of the request signal transmitted from the inside transmitter and a reception sensitivity level of the request signal in the portable unit, thereby causing the size of the communication area to be varied.

6. The control system according to claim 4, wherein:
the lock control means first tries the two-way communication by setting the communication area to the first communication area in the event that the trigger switch is not operated, and
the lock control means then tries again the two-way communication by setting the communication area to the second communication area, when the response signal is not received from the portable unit.

7. The control system according to claim 6, wherein:
the in-vehicle unit further comprises an alarm generating means that generates an alarm to a user; and
the lock control means causes the alarm generating means to generate the alarm without locking the vehicle door when the response signal has been received from the portable unit under a condition that the communication area is set to the first communication area.

8. The control system according to claim 6, wherein:
the lock control means causes the two-way communication to be repeatedly executed a predetermined number of times when the response signal has been received from the portable unit under a condition that the communication area is set to the second communication area; and
the lock control means causes the two-way communication to terminate and causes the alarm generating means to generate the alarm when response signals have been continually received from the portable unit in the predetermined number of times of the two-way communication.

9. The control system according to claim 1, wherein:
the in-vehicle unit further comprises an outside transmitter that transmits the request signal toward a periphery of the vehicle by using the periphery of the vehicle as a communication area with the portable unit; and
the lock control means verifies that the response signal responding to the request signal transmitted from the inside transmitter is not received by the receiver when the trigger switch is not operated, and then locks the vehicle door when the reception of the response signal responding to the request signal transmitted from the outside transmitter becomes impossible.

10. The control system according to claim 9, wherein:
the in-vehicle unit further comprises alarm generating means that generates an alarm to a user; and
the lock control means causes the two-way communication between the outside transmitter and the portable unit to terminate and causes the alarm generating means to generate the alarm, when the number of reception times of response signals responding to the request signal transmitted from the outside transmitter has reached a predetermined number of times.

11. The control system according to claim 1, wherein:
the in-vehicle unit further comprises an outside transmitter that, by using a periphery of the vehicle as a communication area with the portable unit, transmits the request signal toward the periphery of the vehicle; and the lock control means tries the two-way communication with the portable unit by using the inside transmitter and the outside transmitter when the trigger switch is operated, wherein the lock control means locks the vehicle door when the response signal is not received responding to the request signal transmitted from the inside transmitter and when the response signal is received responding to the request signal transmitted from the outside transmitter.

12. The control system according to claim 1, wherein the in-vehicle unit further comprises:

engine control means that controls an operation state of an engine of the vehicle; and permitting means that permits the engine control means to start the engine when the response signal corresponding to the pre-registered code has been received through the two-way communication between the inside transmitter and the portable unit when an instruction for starting the engine has been provided by a user, wherein the communication area varying means sets the communication area for the communication between the inside transmitter and the portable unit to a communication area that is set when the trigger switch has been operated, upon start permission control by the permitting means.

13. A vehicle equipment control method comprising:

transmitting a request signal from an inside transmitter provided in a vehicle compartment when an opening/closing operation of a vehicle door is detected, the request signal having a predetermined output level with which a portable unit is capable of receiving the request signal outside the compartment;

transmitting the request signal from the inside transmitter at an output level lower than the predetermined output level so that the portable unit is capable of receiving the request signal only in a vehicle compartment, when a locking operation of the vehicle door is detected;

transmitting another request signal from an outside transmitter provided outside the vehicle when the portable unit has transmitted no response signal to the request signal transmitted in response to the locking operation; and controlling locking of the vehicle door based on a response signal transmitted from the portable unit.

14. A vehicle equipment control system comprising:

a portable unit that transmits a response signal including an ID code in response to a request signal; and an in-vehicle unit that transmits the request signal, receives the response signal from the portable unit, performs a comparison between the ID code included in the response signal and a pre-registered code, and controls vehicle equipment in accordance with a comparison result, wherein the in-vehicle unit comprises:

a receiver that receives the response signal from the portable unit;

an inside transmitter that, by using a compartment of a vehicle as a communication area for communication with the portable unit, transmits the request signal toward the compartment;

a trigger switch that is proved in a vehicle door and that provides an instruction for locking of the vehicle door;

communication area varying means that, in a case that the trigger switch is not operated, sets the communication area for the communication between the inside transmitter and the portable unit to be relatively large in comparison with a case that the trigger switch has been operated; and lock control means that locks the vehicle door in accordance with an event where the response signal responding to the request signal transmitted from the inside transmitter is not received in the communication area set by the communication area varying means;

wherein the in-vehicle unit further comprises an outside transmitter that transmits the request signal toward a periphery of the vehicle by using the periphery of the vehicle as a communication area with the portable unit; and the lock control means verifies that the response signal responding to the request signal transmitted from the inside transmitter is not received by the receiver when the trigger switch is not operated, and then locks the vehicle door when the reception of the response signal responding to the request signal transmitted from the outside transmitter becomes impossible.

15. A vehicle equipment control system comprising:

a portable unit that transmits a response signal including an ID code in response to a request signal; and an in-vehicle unit that transmits the request signal, receives the response signal from the portable unit, performs a comparison between the ID code included in the response signal and a pre-registered code, and controls vehicle equipment in accordance with a comparison result, wherein the in-vehicle unit comprises:

a receiver that receives the response signal from the portable unit;

an inside transmitter that, by using a compartment of a vehicle as a communication area for communication with the portable unit, transmits the request signal toward the compartment;

a trigger switch that is proved in a vehicle door and that provides an instruction for locking of the vehicle door;

communication area varying means that, in a case that the trigger switch is not operated, sets the communication area for the communication between the inside transmitter and the portable unit to be relatively large in comparison with a case that the trigger switch has been operated; and lock control means that locks the vehicle door in accordance with an event where the response signal responding to the request signal transmitted from the inside transmitter is not received in the communication area set by the communication area varying means;

wherein the in-vehicle unit further comprises an outside transmitter that, by using a periphery of the vehicle as a communication area with the portable unit, transmits the request signal toward the periphery of the vehicle; and the lock control means tries the two-way communication with the portable unit by using the inside transmitter and the outside transmitter when the trigger switch is operated, wherein the lock control means locks the vehicle door when the response signal is not received responding to the request signal transmitted from the inside transmitter and when the response signal is received responding to the request signal transmitted from the outside transmitter.

* * * * *